United States Patent [19]

Anderson

[11] 4,173,732
[45] Nov. 6, 1979

[54] DYNAMIC BRAKE CURRENT LIMITING CONTROL APPARATUS AND METHOD

[75] Inventor: Larry W. Anderson, West Mifflin, Pa.

[73] Assignee: Westinghouse Electric Corp., Pittsburgh, Pa.

[21] Appl. No.: 876,310

[22] Filed: Feb. 9, 1978

[51] Int. Cl.² ........................... H02P 3/12; H02P 3/14
[52] U.S. Cl. .................................. 318/375; 318/376; 318/380
[58] Field of Search ............... 318/370, 375, 376, 379, 318/380

[56] References Cited

U.S. PATENT DOCUMENTS

| 3,577,055 | 5/1971 | Hermansson | 318/376 |
| 3,657,625 | 11/1969 | Miller et al. | 318/376 |
| 3,930,191 | 12/1975 | Loderer | 318/376 |

Primary Examiner—Gene Z. Rubinson
Assistant Examiner—Eugene S. Indyk
Attorney, Agent, or Firm—R. G. Brodahl

[57] ABSTRACT

The heat energy dissipation capacity of the provided dynamic braking resistors for a given transit vehicle is established and then the generated motor current supplied to those resistors by the regenerating propulsion motor of the vehicle during the brake mode of operation is controlled to limit as desired in accordance with that capacity the total energy dissipated by the dynamic braking resistors.

10 Claims, 8 Drawing Figures

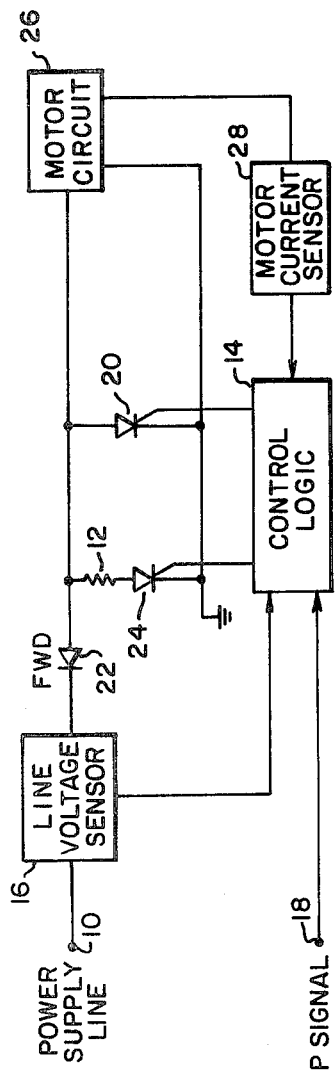
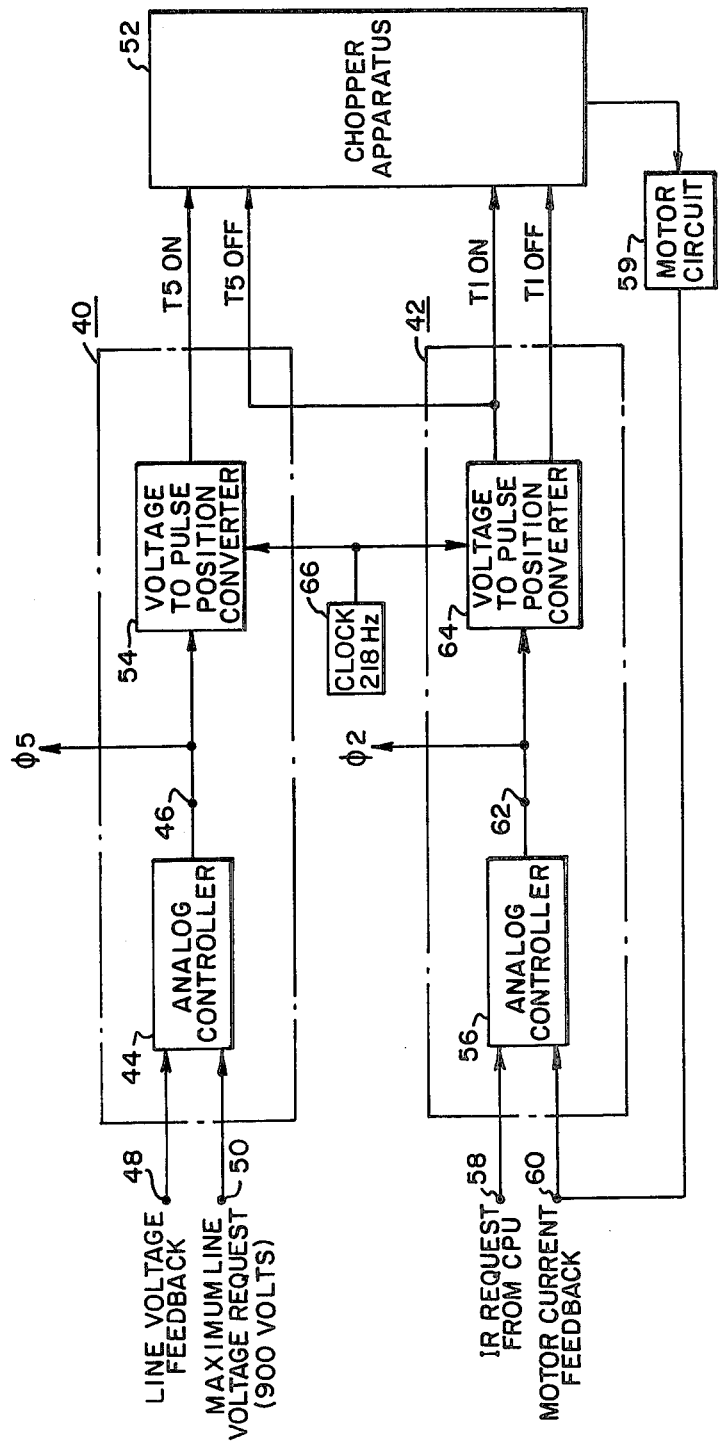
FIG.1
PRIOR ART
FIG.2
PRIOR ART

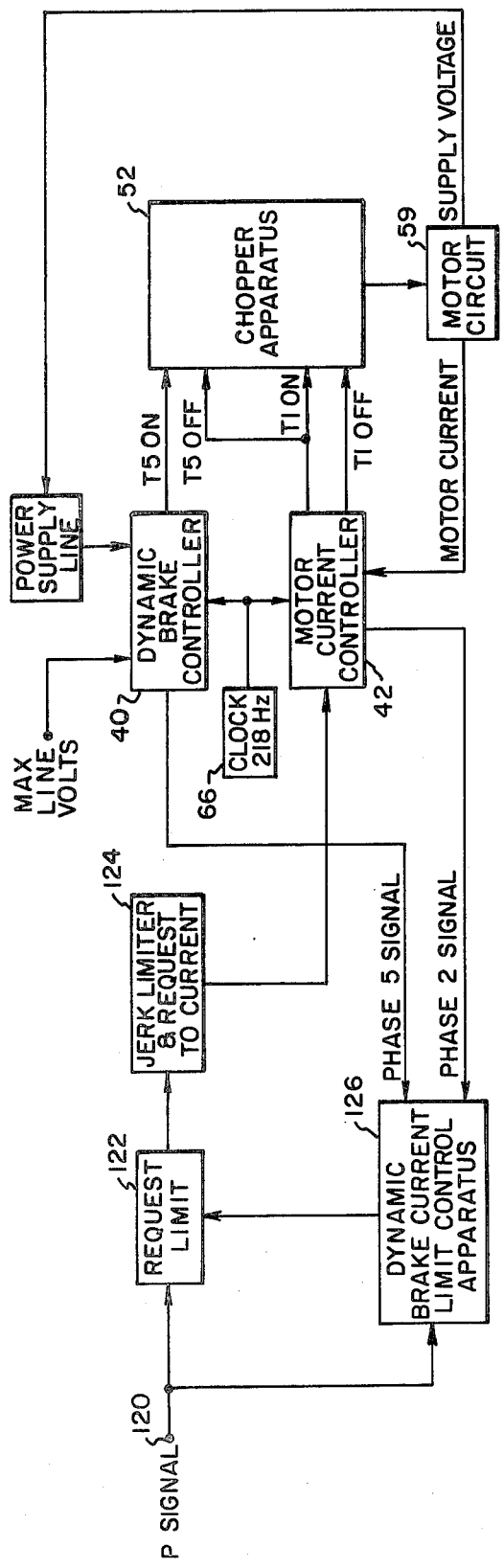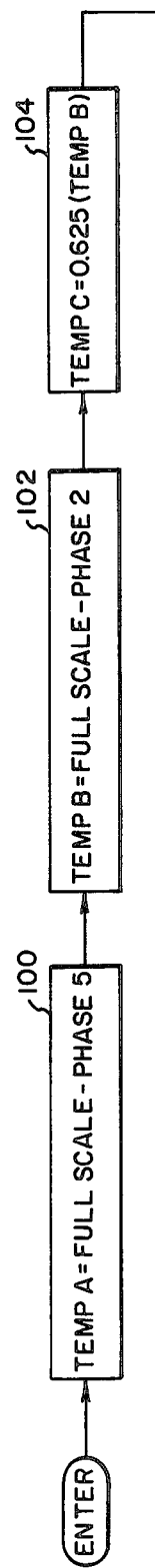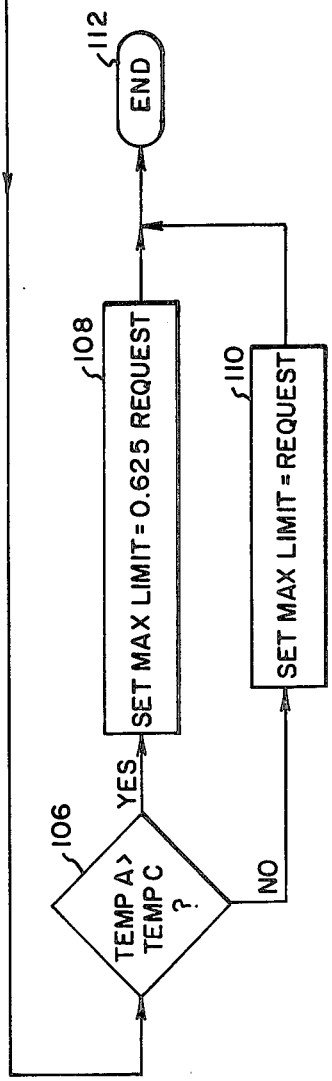
FIG. 4
FIG. 5

DYNAMIC BRAKE CURRENT LIMITING CONTROL APPARATUS AND METHOD

CROSS REFERENCE TO RELATED APPLICATION

The present application is related to the following previously filed patent applications, which are assigned to the same assignee, with the disclosures thereof being incorporated herein by reference.

Ser. No. 709,685, which was filed on July 29, 1976, now U.S. Pat. No. 4,123,693, by L. W. Anderson and J. H. Franz, and is entitled Transit Vehicle Generated Voltage Control Apparatus and Method, and Ser. No. 709,684, which was filed July 29, 1976, now U.S. Pat. No. 4,095,153, by T. C. Matty and J. H. Franz and is entitled Transit Vehicle Electrical Brake Control Apparatus and Method.

BACKGROUND OF THE INVENTION

The present invention relates to the dynamic braking of a transit vehicle, with a brake request P signal indicating the desired brake effort and with the receptivity of the power supply line determining how much regenerative dynamic braking energy is provided to the supply line and how much has to be dissipated in the dynamic braking resistors.

In an article entitled Propulsion Control For Passenger Trains Provides High Speed Service published in the *Westinghouse Engineer* for September 1970 at pages 143 to 149, there is discussed the operation of the P signal to establish the requested brake effort in the brake mode of operation.

In an article entitled Alternative Systems For Rapid Transit Propulsion and Electrical Braking published in the *Westinghouse Engineer* for March 1973 at pages 34 to 41, there is discussed the thyristor chopper operation for dynamic braking, with the generating motors providing output current that is either returned to the supply line or dissipated in a dynamic braking resistor by turning on the thyristor T5 shown in FIG. 3b of that article. The thyristor chopper is fast enough to match regenerated voltage to line voltage.

SUMMARY OF THE INVENTION

A control apparatus for a chopper responsive to a brake effort request signal determines the electric motor current generated in the brake mode of operation to limit the energy dissipated in the dynamic braking resistor. A practical application of the present invention would be for a situation where the physical size and restricted heat dissipation capacity, without overheating of the dynamic braking resistor, in effect limited the power that could be dissipated in that resistor. For this purpose a predetermined percentage of the total braking current provided by the generating propulsion motor is established and if the dynamic braking resistor attempted to receive more than this predetermined percentage of the normal maximum total generated current, then the total permitted generated current is cut back to this same percentage since the dynamic braking resistor is known to be able to receive this predetermined percentage of the normal maximum total generated current.

BRIEF DESCRIPTION OF THE DRAWINGS

FIG. 1 shows a prior art dynamic braking circuit arrangement;

FIG. 2 shows a prior art chopper control apparatus including a dynamic brake controller for providing the T5 thyristor ON control signal and a motor current controller;

FIG. 4 shows a functional representation of the present control apparatus for limiting the braking current supplied to the R5 dynamic braking resistor within the motor circuit;

FIG. 5 shows the control program flow chart in accordance with the present invention;

DESCRIPTION OF A PREFERRED EMBODIMENT

Figure 3:
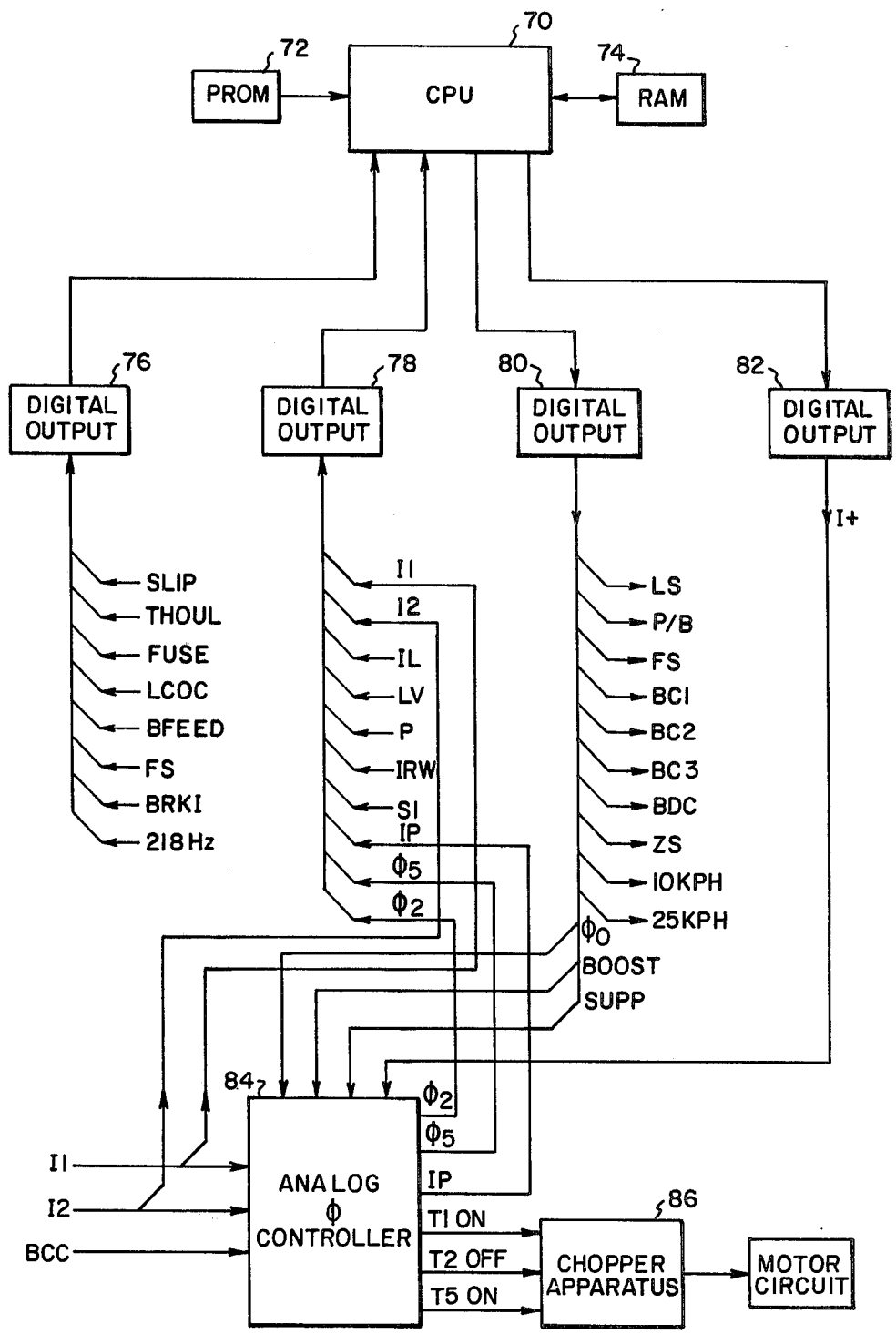
FIG. 3 shows the chopper control apparatus of the present invention including a programmed CPU microprocessor in relation to the input signals and the output signals operative with that control apparatus.

In FIG. 1 there is shown a prior art dynamic braking control circuit arrangement for an electric transit vehicle, whereby braking is accomplished by connecting the propulsion motors as generators. The electrical energy generated by slowing the vehicle must be absorbed by either the power system electrical energy supply line 10 or by dynamic brake resistors 12 carried on board the vehicle.

In the normal operation of the control apparatus shown in FIG. 1, when the R5 dynamic braking resistor 12 can dissipate the full normal generated braking current, power is supplied back to the supply line 10 for as long as the line 10 can accept that power without the supply line voltage increasing to an undesired level, and the control logic 14 senses the voltage of the supply line 10 through operation of the line voltage sensor 16. When the brake mode of operation is requested by the P signal 18 to the control logic 14, the T1 thyristor 20 is turned ON to cause the generated motor current to increase as desired. The turn-on T1 thyristor 20 is turned OFF when the generated brake current reaches the level requested by the P signal at input 18. With the thyristor 20 OFF, the generated current then flows through the free wheeling diode 22 into the supply line 10. If the line 10 cannot accept all of the generated current, the voltage of the line 10 will rise above a predetermined limit. The line voltage sensor 16 indicates this overvoltage condition to the control logic 14, and the control logic 14 turns ON the T5 thyristor 24 which causes the generated current to flow through the dynamic braking resistor 12 until the T1 thyristor 20 is again turned ON. This cycle of operation is repeated at a fixed clock frequency, such as 218 times each second, to control the vehicle braking effort in accordance with the braking request of the P signal applied to input 18. The motor circuit 26 includes the brake current generating propulsion motors in the circuit arrangement shown in the above *Westinghouse Engineer* article for March 1973. The motor current sensor 28 provides motor current signals to the control logic 14. The control apparatus shown in FIG. 1 including control logic 14 can be a hardwired apparatus in accordance with the well known BART chopper system discussed in the above-referenced article published in the March 1973 *Westinghouse Engineer* or the control logic 14 can be a microprocessor with an analog phase controller for controlling the operation of the T1 thyristor 20 and the T5 thyristor 24 in accordance with the disclosure of the above-referenced patent applications Ser. Nos. 709,684 and 709,685.

In FIG. 2 there is shown a prior art chopper control apparatus including a dynamic brake controller 40 and a motor current controller 42, such as included in the transit vehicle control apparatus supplied to BART and described in the above-referenced March 1973 article in the *Westinghouse Engineer*. The dynamic brake controller 40 includes a proportional plus integral controller 44, which compares a voltage feedback signal from the power supply line with a predetermined maximum line voltage reference, such as representing 900 volts, to develop the phase 5 signal at output terminal 46. The phase 5 signal is the output of the controller 44, and determines the conduction of the thyristor T5 and the current flow through the dynamic brake resistor R5. If the measured line voltage at input terminal 48 is less than the desired predetermined limit, such as 900 volts, at input terminal 50 then the phase 5 signal is at or above full scale so no T5 ON pulses are provided to the chopper apparatus 52. On the other hand, if the measured line voltage at input terminal 48 is above the desired limit at input terminal 50, then the phase 5 signal will be pulled back down toward zero volts and the T5 ON pulses will be provided to the chopper apparatus 52. The phase 5 signal is converted by the voltage to pulse position converter 54 to provide the T5 ON signal for controlling the ON condition of the T5 thyristor in the chopper apparatus 52. The T5 thyristor is turned OFF by the T1 ON signal supplied to the chopper apparatus 52. The T5 ON pulse signal is positioned in time relationship to the T1 ON pulse as a function of the phase 5 signal voltage.

The motor current controller 42 includes a proportional plus integral analog controller 56 which compares the IR motor current request determined by the P signal at input terminal 58 with the motor current feedback from the motors in motor circuit 59 at input terminal 60. The motor current feedback is determined as the sum of measured motor currents I1 and I2. The phase 2 signal is developed at output terminal 62. The phase 2 signal goes to the voltage to pulse position converter 64 to determine the T1 ON signal and the T1 OFF signal for establishing how long the T1 thyristor in the chopper apparatus 52 is ON and conductive to maintain the desired generated motor current as requested by the IR signal at input terminal 58. The clock 66 cycles the operation of the control apparatus shown in FIG. 2 at a predetermined rate, such as 218 times every second.

In FIG. 3 there is shown a functional illustration of the present control apparatus in relation to the input signals and the output signals operative therewith, and including a CPU microprocessor 70 operative with a PROM programmable memory 72 and a scratch pad RAM random access memory 74 used for intermediate storage. The dynamic brake limit application program, in accordance with the program listing included in the Appendix, is stored in the programmable memory 72. The microprocessor 70 can be an INTEL 8080, the random access memory 74 can be an INTEL 8101, and the programmable memory 72 can be an INTEL 1702 programmable ready only memory, which items are currently available in the open marketplace. There are four illustrated categories of input and output signals relative to the processor controlled operation of a transit vehicle, as more fully described in the above cross-referenced patent applications Ser. No. 709,684 and Ser. No. 709,685. The digital input signals are supplied through digital input 76 from the transit vehicle and include the slip slide signal SLIP, the thyristor temperature sensor thermal overload signal THOUL, the effective value of the line filter capacitor as indicated by the fuse counter signal FUSE, the power circuit condition indication signal LCOC, the power and brake feedback signal BFEED, the field shunt feedback signal FS, the brake status signal BRKI and the clock signal 218 Hz. The analog input signals are supplied through analog input 78 and include the first propulsion motor leg current I1, the second propulsion motor leg current I2, the line current IL, the power supply line voltage LV, the primary power request or brake request control signal P, the air pressure in the vehicle support bag members providing load weighed current request signal IRW, the analog phase signal IP and the vehicle actual speed signal S1. The phase 2 signal $\phi 2$ and the phase 5 signal $\phi 5$ are supplied to the analog input 78. The digital output signals are supplied through digital output 80 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the 10 kilometer per hour signal 10 KPH, the 25 kilometer per hour signal 25 KPH, the phase zero control signal $\phi_o$, the timing signal BOOST, the ON suppress control signal SUPP and the zero speed signal ZS. The analog output current request signal I+ is supplied through analog output 82 going to an analog phase controller 84 operative to supply the control signal ON to fire the chopper thyristor T1, the control signal OFF to fire the commutating chopper thyristor T2, the control signal T5 ON for the T5 thyristor in the propulsion motor control chopper apparatus 86 and the analog phase indication signal IP going to analog input 78. The time period associated with turning the T1 thyristor in the chopper ON and OFF is at a constant frequency of 218 Hz, that defines the clock time interval for the program cycle and for checking the process operation. During each of the 218 time intervals per second, the program cycle operates through the application program.

On some mass transit vehicles, physical space restrictions can establish that the dynamic braking resistor R5 be smaller than normal and only large enough to dissipate only a portion of the full normal braking current, for example 62.5% thereof.

The control apparatus and method provided by the present invention sense the percentage of the normal full braking current that is flowing in the R5 resistor 12, and limits that current flow to the desired reduced capacity such as 62.5%, of that normal full braking current. It should be noted that the generated brake current must flow through one of the T1 thyristors, the R5 resistor or the diode FWD, and that the energy which must be absorbed is the brake current flowing through the R5 resistor or the diode FWD. Therefore, the percentage of the brake current in the R5 resistor can be established as:

$$\% = \left( \frac{\text{Time in } R5}{\text{Time in } R5 + \text{Time in } FWD} \right) \times 100\% \quad (1)$$

The time current flows in the R5 resistor plus the time current flows in the diode FWD equals the time current does not flow in the T1 thyristor, and the time not in the T1 thyristor equals full scale minus the time in the T1 thyristor, where full scale equals a constant in the operation of a constant frequency chopper. Therefore, the relationship of above equation (1) can be rewritten as follows:

$$\% = \left( \frac{\text{Time in } R5}{\text{Full scale} - \text{Time in } T1} \right) \times 100\% \quad (2)$$

The here provided control procedure then becomes one of (a) to reduce the current request towards the desired reduced capacity, such as 0.625, in relation to the P signal when the time that the current flows in the R5 resistor is determined to be greater than 0.625 times (full scale minus the time current flows in T1 thyristor, and (b) if not the latter, then allow the current request to increase towards the normal generated current level provided by the P signal.

The phase 2 signal $\phi 2$ and the phase 5 signal $\phi 5$ can be used to determine the time occurrences of the current flows of interest, with the phase 2 signal being proportional to the time the brake current flows in the T1 thyristor and the phase 5 signal being proportional to the time the brake current is not flowing in the R5 resistor.

The desired control function can be provided by the microprocessor 70 operative with the software control program shown in FIG. 5. At step 100 of the program TEMP A is set equal to the numerator of above equation (2) or the time current flows in the R5 resistor, which is equal to the time of the total brake current (full scale) minus the time current is not flowing in the R5 resistor as indicated by the phase 5 signal which turns ON the T5 thyristor. At step 102, TEMP B is set equal to the denominator of above equation (2) or full scale minus the time current flows in the T1 thyristor as indicated by the phase 2 signal which turns OFF the T1thyristor. At step 104 TEMP C is set equal to 0.625 times TEMP B. At step 106 a check is made to see if TEMP A is greater than TEMP C, which would indicate that the R5 resistor is trying to dissipate more than the desired 62.5% of the total brake current. If the answer to the check at step 106 is YES, then at step 108 the maximum permitted brake current request limit is set equal to 0.625 times the P signal request. If the answer to the check at step 106 is NO, then at step 110 the maximum permitted brake current request limit is set equal to the whole P signal request. The brake current control program ends at step 112.

In FIG. 4 there is shown a functional block diagram of the brake current control of the present invention. The brake current request P signal is applied to input 120, and is limited at request limit 122 to one of the full request or a predetermined percentage, such as 62.5%, of the full request. The jerk limiter 124 smooths out the abrupt limit changes provided by the request limit 122 and in addition converts the request into a current value which then controls the ON-OFF ratio of the T1 thyristor provided by the motor current controller 42. The dynamic brake controller 40 senses any rise of the supply line voltage and determines the ON-OFF ratio of the T5 thyristor in the chopper 52. The chopper 52 controls the generated brake current of the generating motors in the motor circuit 59. The motor current controller 42 senses the motor current, to determine the control of the T1 thyristor in the chopper 52. The motor current controller 42 provides the phase 2 signal to the dynamic brake current limit control apparatus 126, and the dynamic brake controller 40 supplies the phase 5 signal to the dynamic brake current limit control apparatus 126.

The control operation illustrated in FIGS. 4 and 5, has made unnecessary the direct sensing of the temperature of the R5 resistor using a temperature sensor; the R5 resistor actual temperature to be sensed may be in the order of 600° C. and is in a rather dirty environment under the transit vehicle. Such a temperature sensor could be expensive and one is required for each vehicle, and would likely be substantially less satisfactory than the present invention in operation under all known operating conditions of the mass transit vehicle. The current flow in the R5 resistor could be directly measured by a series connected current transducer, but such a transducer is expensive and one is required for each vehicle. Another possible alternative would be to calculate the current flow in the R5 resistor in relation to each of the sensed motor current, the line current and the sensed vehicle speed, but this would require extensive calculation and motor curve table information that would be more difficult to employ.

Figure 6:
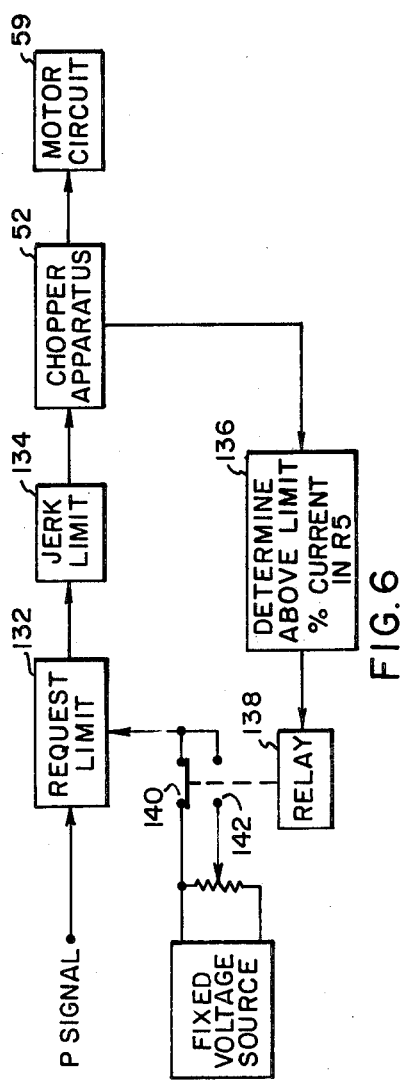
FIG. 6 shows a hardware embodiment of the control apparatus of the present invention.

In FIG. 6 there is shown the P signal for determining the brake effort applied to input 130. The request limit 132 selectively provides one of the full request signal or a predetermined percentage, such as 62.5%, of the full request signal to the jerk limit 134, which slows any change in the provided request limit. The ON-OFF ratio of the T1 thyristor in the chopper 52 is determined by the motor current or effort request applied to the chopper 52 for determining the actual brake current of the propulsion motors in the motor circuit 59. The operation of the chopper 52 in relation to the phase 2 control signal for the T1 thyristor and the phase 5 control signal for the T5 thyristor is sensed to determine the above limit percentage of current in the R5 brake resistor at 136 for operating a relay 138 or like device to provide a full reference control voltage to the request limit 132 from terminal 140 when the current flow through the R5 resistor is below the established predetermined percentage, such as 62.5%, of the full brake current and to provide a reduced reference control voltage to the request limit 132 from terminal 142 when the current flow through the R5 resistor is above this established and predetermined percentage. In general, the higher the phase 2 signal, which is proportional to the ON time of the T1 thyristor, then the more time the current flow is through the T1 thyristor, and the higher the phase 5 signal, which turns ON the T5 thyristor and causes current to flow through the R5 resistor, then the less time the current flow is through the R5 resistor. The phase 2 signal is compared with a timing ramp to generate a fire control pulse for the T2 thyristor to commutate and turn OFF the T1 thyristor.

Figure 7:
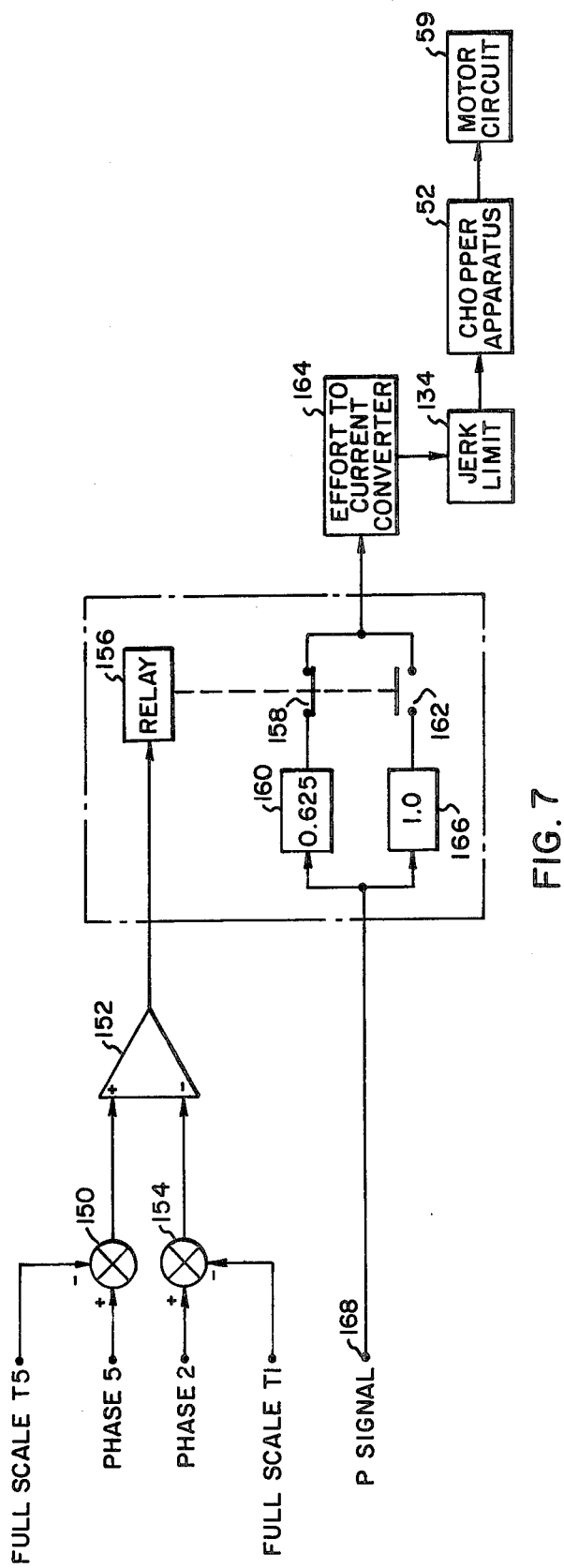
FIG. 7 shows a second hardware embodiment of the control apparatus of the present invention.

In FIG. 7, the phase 5 signal and the brake current full scale signal, when the T5 thyristor is fully OFF, are applied as shown to summing amplifier 150 to give an output signal to summing amplifier 152 which is proportional to the time that current flows through the R5 resistor. The phase 2 signal and the brake current full time signal, when the T1 thyristor is fully ON, are applied as shown to summing amplifier 154 to give an output signal to summing amplifier 152 which is proportional to the time current does not flow in the T1 thyristor. The summing amplifier 152 controls the relay device 156 (similar to relay 138 in FIG. 6) to be energized and close contacts 158 to reduce the current request towards 62.5% of full normal brake current through operation of gain control device 160, when the time period current flows in the R5 resistor becomes greater than 0.625 times the time period the current does not flow in the T1 thyristor. On the other hand, if the summing amplifier 152 does not energize the relay device 156 to pick up the contacts 162 and instead allows gravity to close the normally closed contacts 162, when the time period the current flows in the R5 resistor is not greater than 0.625 times the time period the current does not flow in the T1 thyristor, and this applies the full brake effort request P signal to the effort to current converter 164 through operation of the gain control device 166. When the contacts 158 close, then 62.5% of the P signal effort request applied to input 168 goes to the effort to current converter 164. The output of the converter 164 goes to the jerk limit 134, the chopper 52 for determining the actual brake current of the motors in the motor circuit 59.

Figure 8:
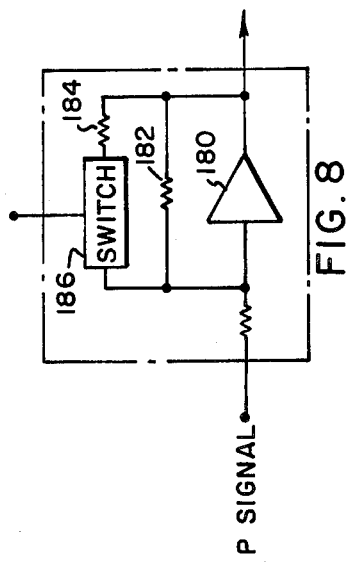
FIG. 8 shows an operational amplifier operative to provide selectively a gain of 1.0 or a gain of 0.625 in relation to the P signal.

In FIG. 8 there is shown an operational amplifier 180 having a unity gain determining shunt resistor 182. In addition, a parallel resistor 184 in series with a switch 186, such as a field effect transistor, when the switch 186 is closed this couples the resistor 184 in parallel with the resistor 182, providing a 0.625 gain characteristic in relation to the P signal applied to the input of the amplifier 180. The output of the summing amplifier 152 shown in FIG. 7 could be applied to the switch 186 of FIG. 8, instead of the relay device 156 of FIG. 7, with its associated contacts 158 and 162, for determining the actual brake current of the propulsion motors in the motor circuit 59 if desired.

The program listing included in the Appendix is written in assembly language for use with the INTEL 8080 microprocessor, such as the central processor 70 shown in FIG. 3. This program listed is configured as a subroutine to implement the control function illustrated by the program flow chart of FIG. 5. The numbers used in the listing are in the hexadecimal number system, which is a base 16 number system.

| APPENDIX | | | | |
|---|---|---|---|---|
| DYNAMIC BRAKE LIMIT ROUTINE | | | | |
| 051F 210D0F | T5LIM: | LXI | H, ?PHA5 | |
| 0522 3EC8 | | MVI | A, 0C8H | FULL SCALE |
| 0524 96 | | SUB | M | 1 - T5 |
| 0525 DA5405 | | JC | T5L1 | T5>MAX |
| 0528 47 | | MOV | B,A | SAVE AS TA |
| 0529 2E0F | | MVI | L, ?PHA2 | AND 0FFH |
| 052B 3EC8 | | MVI | A, 0C8H | FULL SCALE |
| 052D 96 | | SUB | T5L1 | T2>MAX |
| 0531 4F | | MOV | C, A | SAVE AS TB |
| 0532 1F | | RAR | | 0.5 TB |
| 0533 57 | | MOV | D, A | |
| 0534 1F | | RAR | | |
| 0535 1F | | RAR | | |
| 0536 E61F | | ANI | 1FH | ⅛(1-T2) |
| 0538 82 | | ADD | D | ⅝(1-T2) |

| -continued | | | | |
|---|---|---|---|---|
| APPENDIX | | | | |
| 0539 B | | CMP | B | |
| 053A D25405 | | JNC | T5L1 | 1-T5<⅝(1-T2) |
| SET TEL3 | | | | |
| 053D 2E46 | | MVI | L, ?TER1 AND 0FFH | |
| 053F 3A3D0F | | LDA | ?TEL4 | |
| 0542 BE | | CMP | M | |
| 0543 DA4705 | | JC | T5L2 | TER1>TEL4 |
| 0546 7E | | MOV | A, M | |
| 0547 1F | T5L2: | RAR | | SET TEL3=⅝ OF LOWER |
| 0548 E67F | | ANI | 7FH | |
| 054A 5F | | MOV | E, A | |
| 054B | | RAR | | |
| 054D E61F | | ANI | 1FH | |
| 054F 83 | | ADD | E | |
| 0550 323C0F | | STA | ?TEL3 | |
| 0553 C9 | | RET | | |
| 0554 3EFF | T5L1: | MVI | A, 0FFH | SET TEL3=MAX |
| 0556 323C0F | | STA | ?TEL3 | |
| 0559 C9 | | RET | | |

I claim:

1. In control apparatus for a chopper having a current conducting thyristor and being responsive to a brake effort request signal for determining the current of a transit vehicle electric motor operating as a generator and thereby the brake effort provided when that current is supplied to a dynamic braking resistor, the combination of
   means for determining a first time interval that current from said motor flows in the dynamic braking resistor,
   means for determining a second time interval that current from said motor is not flowing in said thyristor,
   means for establishing a predetermined relationship between said first time interval and said second time interval, and
   means for controlling the current generated by said motor in response to said predetermined relationship.

2. The control apparatus of claim 1, with said relationship establishing a predetermined percentage of the normal maximum total generated current to be dissipated by said dynamic braking resistor.

3. The control apparatus of claim 1, with the total generated current provided by said motor being controlled in relation to a desired limit on the current flow through said dynamic braking resistor.

4. The control apparatus of claim 1, with said relationship being determined to establish a desired percentage limit on the normal full braking current to flow in the dynamic braking resistor.

5. In the method of controlling a transit vehicle chopper apparatus in response to a brake effort request signal for determining the current generated by an electric propulsion motor in relation to the current supplied to a dynamic braking resistor, the steps of establishing the braking current generated by said motor,
   establishing the percentage of the normal full braking current that is flowing in the dynamic braking resistor, and
   controlling the current generated by said motor in response to said percentage to provide a predetermined limit on the current flow in the dynamic braking resistor.

6. The method of claim 5, with the step of establishing the percentage of the braking current that is flowing in the dynamic braking resistor being in relation to the time current flows in the dynamic braking resistor.

7. The method of claim 5, with said step of controlling the current generated by said motor being operative to select one of reducing the brake effort request signal or allowing the full normal generated current level provided by said brake effort request signal.

8. The method of claim 5, including the step of establishing the time the brake current is not flowing in the dynamic braking resistor.

9. In control apparatus for a chopper having a current conducting thyristor and being responsive to a brake effort request signal for determining the current of a transit vehicle electric motor operating as a generator and thereby the brake effort provided when that current is supplied to a dynamic braking resistor, the combination of means for determining for each of predetermined time intervals a first duration that current from said motor flows in the dynamic braking resistor, means for determining for each of said time intervals a second duration that current from said motor is not flowing in said thyristor, means for establishing a predetermined relationship for each said time interval between said first duration and said second duration, and means for controlling for each said time interval the current generated by said motor in response to said predetermined relationship.

10. The control apparatus of claim 9 including a clock for establishing said predetermined time intervals and being operative to limit the energy dissipated in the dynamic braking resistor, with said predetermined relationship being a percentage of the total braking current provided by the generating electric motor.

* * * * *